(12) United States Patent
Lee et al.

(10) Patent No.: US 8,919,218 B2
(45) Date of Patent: Dec. 30, 2014

(54) TRANSMISSION SYSTEM FOR SHIFT BY WIRE

(75) Inventors: Sungil Lee, Hwaseong-si (KR); Hangil Park, Suwon-si (KR); Changhyun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 337 days.

(21) Appl. No.: 13/488,803

(22) Filed: Jun. 5, 2012

(65) Prior Publication Data

US 2013/0145886 A1    Jun. 13, 2013

(30) Foreign Application Priority Data

Dec. 9, 2011  (KR) .......................... 10-2011-0131539

(51) Int. Cl.
*F16H 59/02*    (2006.01)

(52) U.S. Cl.
USPC .................. 74/473.21; 74/473.23; 74/473.24; 74/473.25; 192/220.2

(58) Field of Classification Search
CPC .... F16H 61/22; F16H 2061/223; F16H 59/10
USPC ................. 74/473.12, 473.1, 473.21, 473.23, 74/473.24, 473.25; 192/220.2, 220.4
See application file for complete search history.

(56) References Cited

U.S. PATENT DOCUMENTS

| | | | | |
|---|---|---|---|---|
| 4,947,970 | A * | 8/1990 | Miller et al. ..................... | 477/30 |
| 5,025,901 | A * | 6/1991 | Kito et al. .................... | 192/220.7 |
| 5,197,003 | A * | 3/1993 | Moncrief et al. ................ | 434/71 |
| 5,662,553 | A | 9/1997 | Reichlinger | |
| 5,671,638 | A * | 9/1997 | Hattori et al. ............... | 74/483 R |
| 5,685,405 | A * | 11/1997 | Morikawa et al. .......... | 192/220.2 |
| 5,799,517 | A * | 9/1998 | Hattori et al. ..................... | 70/247 |
| 5,809,835 | A | 9/1998 | Beim et al. | |
| 6,076,414 | A | 6/2000 | Tabata et al. | |
| 6,336,373 | B1 * | 1/2002 | Murai et al. ............... | 74/473.23 |
| 6,362,810 | B1 | 3/2002 | Matsuda | |
| 6,676,562 | B1 * | 1/2004 | Bulgrien .......................... | 477/74 |
| 6,827,195 | B2 * | 12/2004 | Kliemannel ............... | 192/220.4 |
| 6,948,582 | B2 | 9/2005 | Shiomi et al. | |
| 6,976,569 | B2 * | 12/2005 | Khaykin et al. ........... | 192/220.4 |
| 7,213,483 | B2 | 5/2007 | Inoguchi et al. | |
| 7,293,480 | B2 * | 11/2007 | Matsui et al. ............... | 74/473.12 |
| 7,308,838 | B2 * | 12/2007 | Inoguchi et al. ........... | 74/473.23 |
| 7,681,706 | B2 | 3/2010 | Umeda | |
| 7,740,101 | B2 * | 6/2010 | Yanaka ......................... | 180/315 |
| 8,387,478 | B2 | 3/2013 | Park et al. | |
| 8,400,342 | B2 * | 3/2013 | Zimmerman et al. ........ | 341/161 |
| 8,401,747 | B2 * | 3/2013 | Ito .................................... | 701/51 |
| 2004/0014559 | A1 * | 1/2004 | Bulgrien ......................... | 477/71 |
| 2004/0031660 | A1 * | 2/2004 | Kliemannel ............... | 192/220.4 |
| 2004/0195071 | A1 * | 10/2004 | Khaykin et al. ........... | 192/220.2 |
| 2004/0226801 | A1 * | 11/2004 | De Jonge et al. .......... | 192/220.7 |
| 2011/0035123 | A1 * | 2/2011 | Katrak et al. .................... | 701/55 |
| 2011/0036193 | A1 | 2/2011 | Ueta et al. | |
| 2013/0345941 | A1 * | 12/2013 | Katrak et al. ................... | 701/60 |

FOREIGN PATENT DOCUMENTS

| | | |
|---|---|---|
| EP | 0 307 846 A1 | 3/1989 |
| EP | 1 884 858 A1 | 2/2008 |
| EP | 1 239 192 B1 | 12/2010 |
| JP | 61-38279 A | 2/1986 |
| JP | 61-201121 U | 12/1986 |
| JP | 5-118413 A | 5/1993 |
| JP | 7-21879 A | 1/1995 |
| JP | 10-258625 A | 9/1998 |
| JP | 2002-262549 A | 9/2002 |
| JP | 2003-133930 A | 5/2003 |
| JP | 4642419 B2 | 12/2010 |
| JP | 2011-37368 A | 2/2011 |
| KR | 1999-0086771 A | 12/1999 |
| KR | 10-2010-0123150 A | 11/2010 |
| KR | 10-2011-0006923 A | 1/2011 |
| KR | 10-2011-0062880 A | 6/2011 |
| KR | 10-2011-0062888 A | 6/2011 |

* cited by examiner

*Primary Examiner* — David M Fenstermacher
(74) *Attorney, Agent, or Firm* — Morgan, Lewis & Bockius LLP

(57) ABSTRACT

The automatic transmission system includes a shift lever for changing stages by a user, a shift-lock device for fixing or releasing the shift lever, and a control unit including a shift control logic changing the stages of the transmission in accordance with the stage changed by the shift lever and a shift-lock control logic controlling the shift-lock device by stages for an initial time and a maintenance time after the initial time from when the stages may be changed such that the shift lever may be fixed, in order to shift-lock the shifted shift lever when the stages may be changed by the shift control logic.

3 Claims, 3 Drawing Sheets

TRANSMISSION SYSTEM FOR SHIFT BY WIRE

CROSS-REFERENCE TO RELATED APPLICATIONS

The present application claims priority to Korean Patent Application Number 10-2011-0131539 filed Dec. 9, 2011, the entire contents of which application is incorporated herein for all purposes by this reference.

BACKGROUND OF THE INVENTION

1. Field of the Invention

The present invention relates to a transmission system for shift-by-wire (SBW), and particularly, to a transmission system for shift-by-wire in which shift-lock of a shift lever is implemented by a solenoid.

2. Description of Related Art

A transmission system for shift-by-wire is a transmission that electronically performs shifting control by using a shift lever and an ECU and equipped with a shift-lock device for preventing shifting due to a wrong operation.

A shift-lock device of a transmission system for shift-by-wire of the related art is necessarily equipped with a solenoid to implement a physical shift-lock structure of a shift lever.

However, in the transmission system for shift-by-wire of the related art, the solenoid keeps operating by a DC current from the initial operation to the maintenance operation for shift-lock, such that malfunction or a breakdown is frequently generated by operational high temperature/heating.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission system for shift-by-wire that can minimize malfunction and a breakdown of a solenoid by controlling the operational frequency of the solenoid, which is in connection with shift-lock of a shift lever.

In an aspect of the present invention, a transmission system for shift-by-wire, may include a shift lever for changing stages of a transmission by a user, a shift-lock device for fixing or releasing the shift lever, and a control unit including a shift control logic changing the stages of the transmission in accordance with a stage signal changed by the shift lever, and a shift-lock control logic controlling the shift-lock device in accordance with the stages for an initial time and a maintenance time after the initial time from when the stages are changed such that the shift lever is fixed, in order to shift-lock the shifted shift lever when the stages are changed by the shift control logic.

The shift-lock device may include a fixing cam fixing or releasing the shift lever, and an actuator pivotally coupled to the fixing cam and actuating the fixing cam wherein the shift-lock control logic drives the actuator such that the fixing cam fixes the shift lever, by applying a PWM (Pulse Width Modulation) current signal with a predetermined duty rate for the maintenance time after applying a DC current signal for the initial time.

The actuator is a solenoid.

The DC current signal is a PWM current signal with a duty rate of approximately 90% to approximately 100% and the predetermined duty rate is approximately 40% to approximately 60%.

As described above, the present invention can minimize malfunction and a breakdown of the solenoid by controlling the operational frequency of the solenoid, by applying a PWM current signal for improve the operation speed and response to solenoid during an initial operation for shift-lock of the shift lever, and applying a PWM current signal with a duty rate that can maintain only the position of the solenoid during a maintenance operation after the initial operation.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
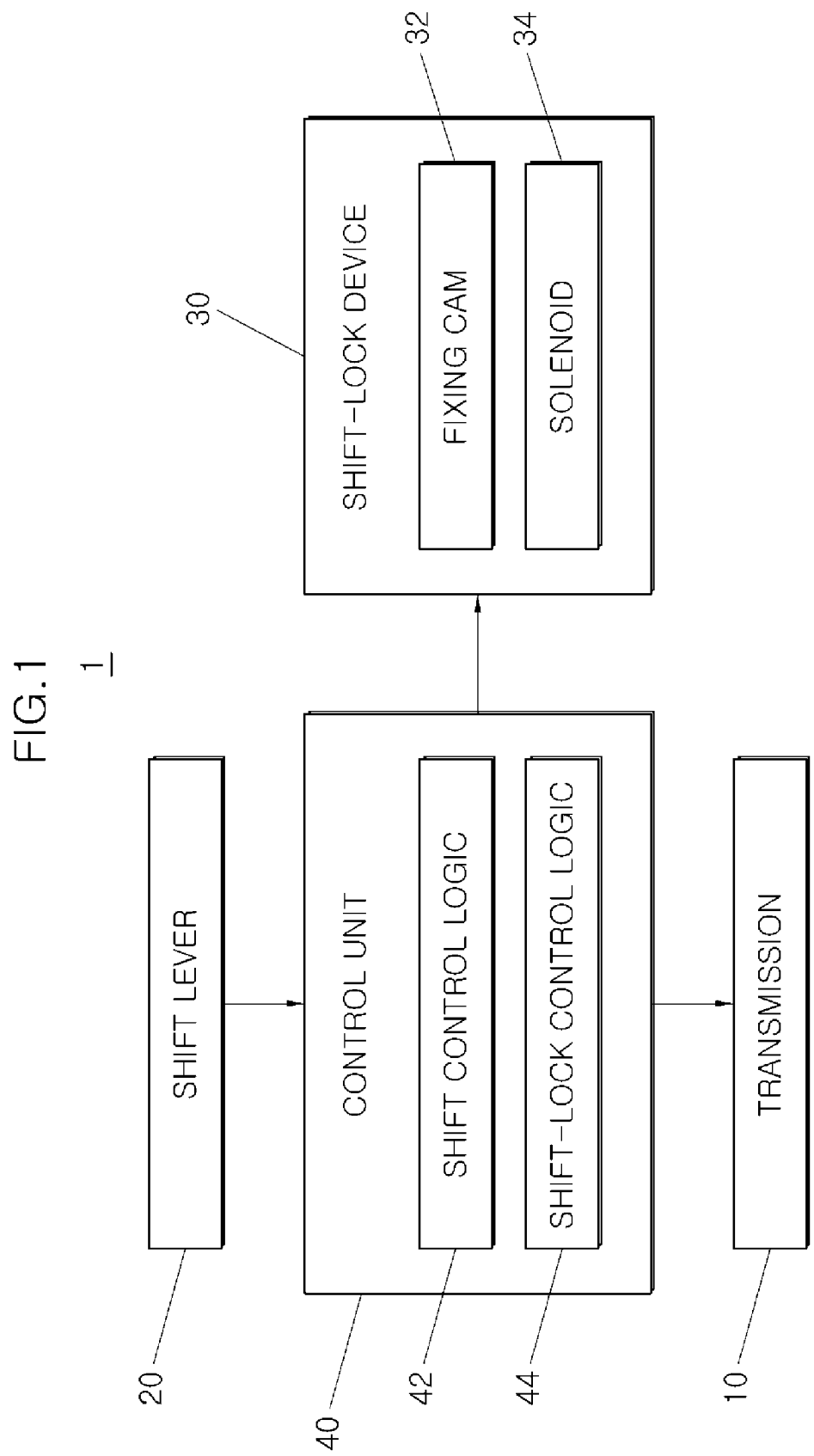
FIG. 1 is a block diagram of an automatic transmission system for shift-by-wire according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an automatic transmission system for shift-by-wire according to an exemplary embodiment of the present invention will be described in detail with reference the accompanying drawings.

FIG. 1 is a block diagram of an automatic transmission system for shift-by-wire 1 according to an exemplary embodiment of the present invention. Referring to FIG. 1, an automatic transmission system for shift-by-wire includes a transmission 10, a shift lever 20, and a control unit 40.

Transmission 10 is for shift-by-wire (SBW) and can be shifted by operating a shift lever 20. Shift lever is an operation device for changing the stages of transmission 10 by a user.

Figure 2:
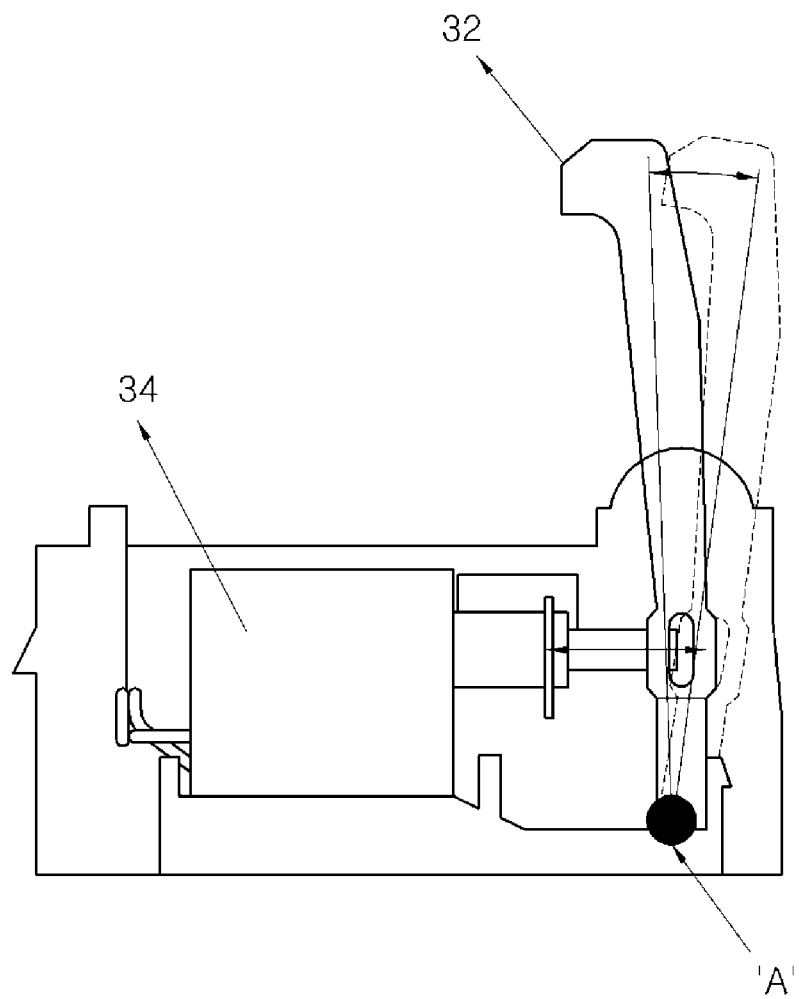
FIG. 2 is a schematic view of a shift-lock device according to an exemplary embodiment of the present invention.

Shift-lock device 30, as shown in FIG. 2, includes a fixing cam 32 that performs a mechanical operation for fixing and releasing shift lever 20 and a solenoid 34 that implements the mechanical operation of the fixing cam 32. The fixing cam 32 can implement shift-lock of shift lever 20 by rotating around a hinge shaft A in response to a straight motion of a rod of solenoid 34.

Control unit 40, as shown in FIG. 1, may include a shift control logic 42 and a shift-lock control logic 44.

Shift control logic 42 is a logic changing the stages of transmission 10 in accordance with the stage changed by shift lever 20.

When the stage is changed by shift control logic 42, shift-lock control logic 44 controls shift-lock device 30 by stages for an initial time and a maintenance time after the initial time from when the stage is changed to fix shift lever 20 that is shifted.

That is, shift-lock control logic 44 can drive solenoid 34 such that fixing cam 32 fixes shift lever 20 by applying a PWM current signal with a predetermined duty rate for the maintenance time after a DC current signal is applied for the initial time. The DC current signal applied for the initial time is a PWM current signal with a duty rate of 90 to 100% and the PWM current signal applied for the maintenance time may have a duty rate of 40 to 60%.

Figure 3:
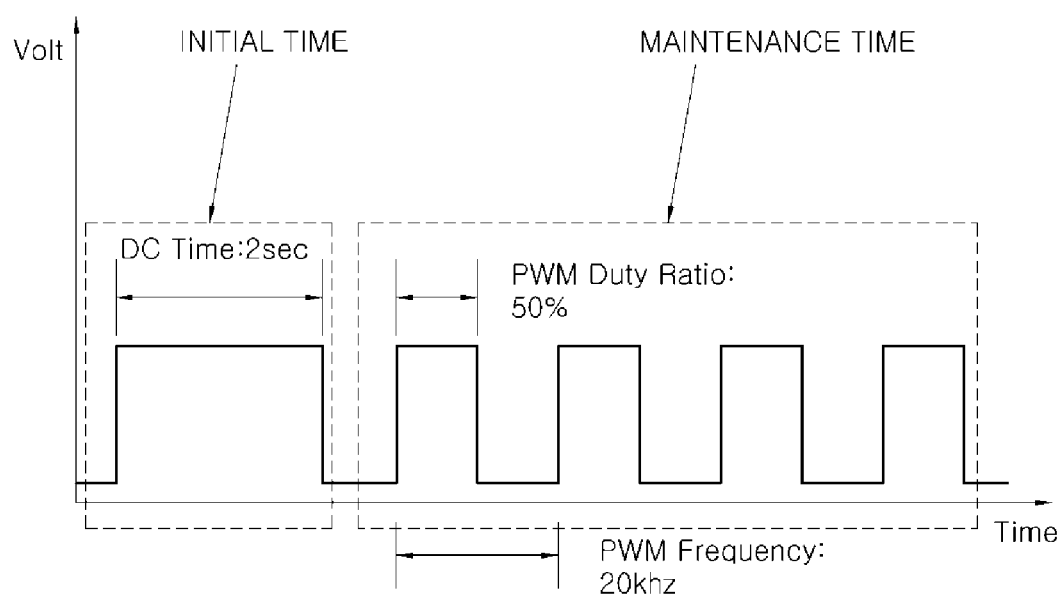
FIG. 3 is a graph illustrating the operation of a shift-lock device according to an exemplary embodiment of the present invention.

Referring to FIG. 3, shift-lock control logic 44 applies a PWM current signal with a duty rate of 100% for 2 seconds, which is the initial time, from when the stage of transmission 10 is changed, and applies a PWM current signal with a duty rate of 50% for the maintenance time after the initial time.

As described above, automatic transmission system for shift-by-wire according to an exemplary embodiment of the present invention can minimize malfunction and a breakdown of solenoid 34 by controlling the operational frequency of solenoid 34, by applying a PWM current signal for improving the operation speed and response to solenoid 34 during an initial operation for shift-lock of shift lever 20, and applying a PWM current signal that can maintain only the position of solenoid 34 during a maintenance operation after the initial operation.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system for shift-by-wire, comprising:
a shift lever for changing stages of a transmission by a user;
a shift-lock device for fixing or releasing the shift lever; and
a control unit including:
    a shift control logic changing the stages of the transmission in accordance with a stage signal changed by the shift lever; and
    a shift-lock control logic controlling the shift-lock device in accordance with the stages for an initial time from when the stages are changed such that the shift lever is fixed and which is time for an initial operation for shift-lock of the shift lever and a maintenance time which is time for a maintenance operation for the shift-lock after the initial time, in order to shift-lock the shifted shift lever when the stages are changed by the shift control logic,
wherein the shift-lock device includes:
    a fixing cam fixing or releasing the shift lever; and
    an actuator pivotally coupled to the fixing cam and actuating the fixing cam wherein the shift-lock control logic drives the actuator such that the fixing cam fixes the shift lever, by applying a PWM current signal with a predetermined duty rate for the maintenance time to maintain the position of the actuator after applying a DC current signal for the initial time, wherein the DC current signal is a PWM (Pulse Width Modulation) current signal with a duty rate of approximately 90% to approximately 100% and the predetermined duty rate is approximately 40% to approximately 60%.

2. The transmission system for shift-by-wire as defined in claim 1, wherein the actuator is a solenoid.

3. The transmission system for shift-by-wire as defined in claim 1, wherein the DC current signal is a PWM current signal with a duty rate of 90 to 100% and the predetermined duty rate is 40 to 60%.

* * * * *